Aug. 27, 1957  G. ELJANIAN ET AL  2,803,865
JOINING SEPARATE MOLDED SECTIONS OF POLYETHYLENE
Filed April 9, 1956
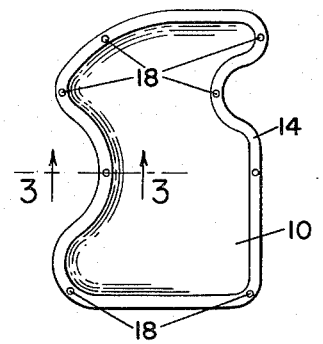
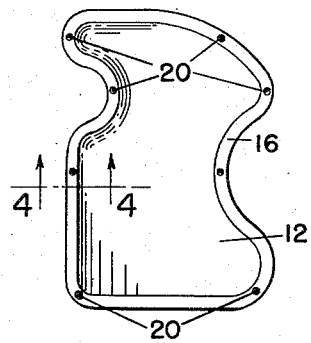
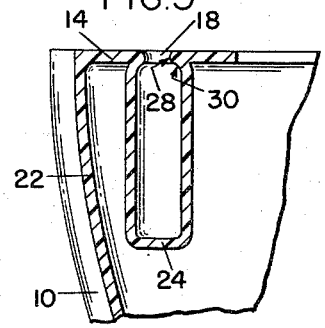
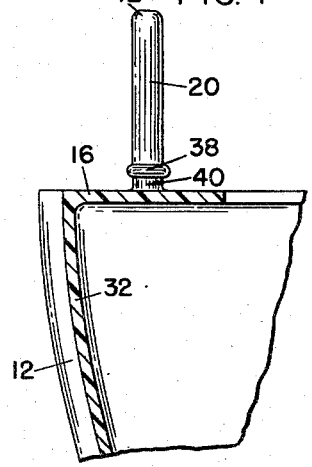
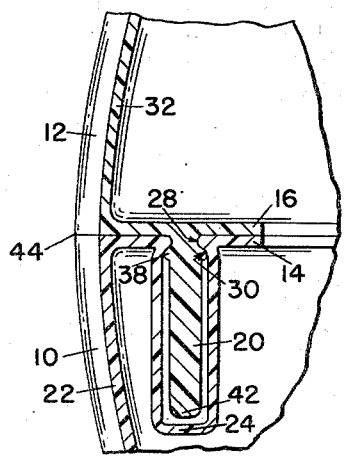
INVENTORS
GEORGE ELJANIAN
PAUL J. ANDONIAN
ATTORNEY

2,803,865

JOINING SEPARATE MOLDED SECTIONS OF POLYETHYLENE

George Eljanian and Paul J. Andonian, Worcester, Mass.

Application April 9, 1956, Serial No. 577,066

1 Claim. (Cl. 24—204)

This invention relates to means and method for securely joining two or more separately molded parts or sections of polyethylene molded plastic material, this invention relating particularly to mechanical means for securely joining the parts together in the absence of any kind of adhesive or cement.

It has been impossible to join sections of polyethylene plastic heretofore due to the fact that there is no appropriate solvent or cement which may be used to do the joining of polyethylene parts, although other thermoplastic resins such as styrene and acetate may be joined by suitable solvents.

The present invention comprises forming one or more parts with hollow cylindrical members having constricted openings therein, somewhat in the nature of dowel holes, which are molded as a part of the polyethylene section; with cooperating and corresponding solid parts or pins molded integrally as a part of corresponding polyethylene sections to be joined therewith, said solid parts or pins being provided with enlargements which snap past the constrictions in the hollow cylindrical members, which due to the nature of the polyethylene material slip past the restricted openings of the hollow cylindrical members so as to catch and hold the parts together merely by thrusting the same together in the manner of dowels into dowel holes.

Other objects and advantages of the invention will appear hereinafter.

Reference is to be had to the accompanying drawings, in which:

Figs. 1 and 2 are views in elevation illustrating complementary irregularly shaped molded polyethylene parts which are to be secured together;

Fig. 3 is an enlarged view, taken on the line 3—3 in Fig. 1;

Fig. 4 is an enlarged view, taken on the line 4—4 of Fig. 2; and

Fig. 5 is a similar section illustrating the parts joined together.

It being impossible to cement polyethylene molded parts, it will be appreciated that it has been heretofore impossible to make a ball of two hemispheres of polyethylene and secure them together. However, it is likewise impossible to make more complex members such as irregularly molded shapes in the toy art, such shapes being complementarily molded to be secured together by cementing. Whereas this may be easily done so as to articles of styrene, acetate, etc., it has heretofore been impossible to make such articles of polyethylene, and therefore all polyethylene articles have had to be molded complete in one piece such as for instance tumblers, bowls, cups, etc. The present method and means provides for closely and permanently securing complementary hollow molded polyethylene parts together.

Referring now to the drawings, the reference character 10 indicates generally a molded polyethylene part or section which is made complementary to that illustrated at 12, such part being shown in Fig. 1, and its complementarily molded part 12 being shown in Fig. 2. Insofar as appears from Figs. 1 and 2, the mating rims 14 and 16 of these two parts are provided respectively with holes 18 and corresponding projecting pins 20, but these holes and pins are not conventional dowel holes or pins such as are known in the art but are of a particular new construction as will be described hereinafter.

Referring to the greatly enlarged section in Fig. 3, the molded section 10 is shown as having a relatively thin wall 22, and its surface 14 is a flange, which is to mate with the flange-like surface 16 of the part 12, is provided with integrally molded hollow cylindrical depending members generally indicated at 24.

It must be remembered that polyethylene is in general a somewhat rubbery, distortable, flexible material which gives to some extent under pressure and then returns to original condition upon pressure release. The hollow member 24 is shown as extending inwardly away from the surface 14 in the manner of a short pipe or the like, and it has the opening 18 formed by the shoulders or necked-in annular member at 28, this in turn forming the under shoulder or restriction at 30, which in turn is annular, although it may of course be made in other shapes.

In Fig. 4, the mating construction is shown, wherein the molded piece 12 having the thin wall 32 and the inwardly directed flange with the surface 16, is provided with an outwardly extending, integrally molded polyethylene pin 20, the same being provided with an annular enlargement or ring or the like illustrated at 38. This ring is spaced slightly from the surface 16 as at 40.

Upon inverting the piece 12 over the piece 10, the beveled off end 42 of the pin or rod 20 will lie opposite the opening 18 and a thrust upon the two members 10 and 12 together will cause dilation of the part at 28 in Fig. 3, allowing the rod 20 to penetrate the same, with the annular enlargement 38 passing the constriction 28 and coming to rest firmly against shoulder 30 as is shown in Fig. 5. Of course all the other pins and hollow members are made in substantially the same manner and are appropriately spaced about the peripheries of the members to be joined so as to firmly and permanently hold the two members together in tight abutting relationship.

The polyethylene article made according to the above described invention provides a two or more part article the sections of which will be firmly gripped together so as to provide balls, toys or any similar articles made of polyethylene, the same having heretofore not been possible due to the lack of appropriate solvent or cement for this purpose. The sections will be very firmly held together and it is particularly pointed out that the parting line at 44 will not open up or gap even under continued use of the article which is assembled by means of the present invention.

Having thus described our invention and the advantages thereof, do not wish to be limited to the details herein disclosed, otherwise than as set forth in the claim, but what we claim is:

A hollow, closed polyethylene article molded in two or more sections, said sections having mating edges, said sections having a substantially permanent connection at the mating edges, said connection comprising a series of integral extending pins at the edges of one section and integral rearwardly directed hollow members at the mating edges of another section, each of the pins at an edge being opposite a pin at an opposite edge, said hollow members each having a restricted passage and each pin having an enlargement thereon, said polyethylene material being resilient and distortable to allow the insertion of the pins in the hollow members, the enlargements on the pins snapping past and being held under the constricted portions of the hollow members, the enlargements and restricted portions being located to hold the mating edges substantially in the same plane and firmly and tightly in substantially permanent contact throughout the complete extent of said edges.

References Cited in the file of this patent

UNITED STATES PATENTS

| | | |
|---|---|---|
| 1,780,555 | Johnson | Nov. 4, 1930 |
| 2,367,657 | Boersma | Jan. 23, 1945 |
| 2,397,801 | Mitchell | Apr. 2, 1946 |
| 2,502,860 | Leithiser | Apr. 4, 1950 |
| 2,639,530 | Merrill | May 26, 1953 |
| 2,663,751 | Bashara | Dec. 22, 1953 |
| 2,714,269 | Charles | Aug. 2, 1955 |
| 2,767,005 | Jorgensen | Oct. 16, 1956 |

FOREIGN PATENTS

| | | |
|---|---|---|
| 724,364 | Great Britain | Feb. 16, 1955 |